United States Patent
Tashiro

(10) Patent No.: US 11,997,234 B2
(45) Date of Patent: May 28, 2024

(54) INSPECTION DEVICE FOR INSPECTING QUALITY OF PRINTED IMAGES

(71) Applicant: FUJIFILM Business Innovation Corp., Tokyo (JP)

(72) Inventor: Yosuke Tashiro, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 157 days.

(21) Appl. No.: 17/347,565

(22) Filed: Jun. 14, 2021

(65) Prior Publication Data
US 2022/0094796 A1  Mar. 24, 2022

(30) Foreign Application Priority Data
Sep. 18, 2020  (JP) .................................. 2020-157922

(51) Int. Cl.
*H04N 1/00*  (2006.01)
*G06T 7/00*  (2017.01)

(52) U.S. Cl.
CPC ......... *H04N 1/00037* (2013.01); *G06T 7/001* (2013.01); *H04N 1/00005* (2013.01); *H04N 1/00074* (2013.01)

(58) Field of Classification Search
None
See application file for complete search history.

(56) References Cited

U.S. PATENT DOCUMENTS

| | | | |
|---|---|---|---|
| 2020/0009860 A1* | 1/2020 | Kamada | G06T 7/11 |
| 2020/0288030 A1* | 9/2020 | Tsukamoto | H04N 1/00803 |
| 2021/0118115 A1* | 4/2021 | Tsukamoto | G06T 1/20 |
| 2022/0291879 A1* | 9/2022 | Okabe | G06F 3/1238 |
| 2023/0088442 A1* | 3/2023 | Suzuki | B41J 2/2142 |
| | | | 358/1.13 |

FOREIGN PATENT DOCUMENTS

JP  6323190  5/2018

* cited by examiner

*Primary Examiner* — Eric A. Rust
(74) *Attorney, Agent, or Firm* — JCIPRNET

(57) ABSTRACT

An inspection device includes a processor configured to perform a first inspection of using original image data as first reference image data and collating the first reference image data with at least one of plural pieces of read image data obtained by reading image-formed matters obtained by forming the first reference image data on plural recording media, and register read image data satisfying a predetermined criterion among the plural pieces of read image data as a result of the first inspection, as second reference image data for a second inspection different from the first inspection.

14 Claims, 5 Drawing Sheets

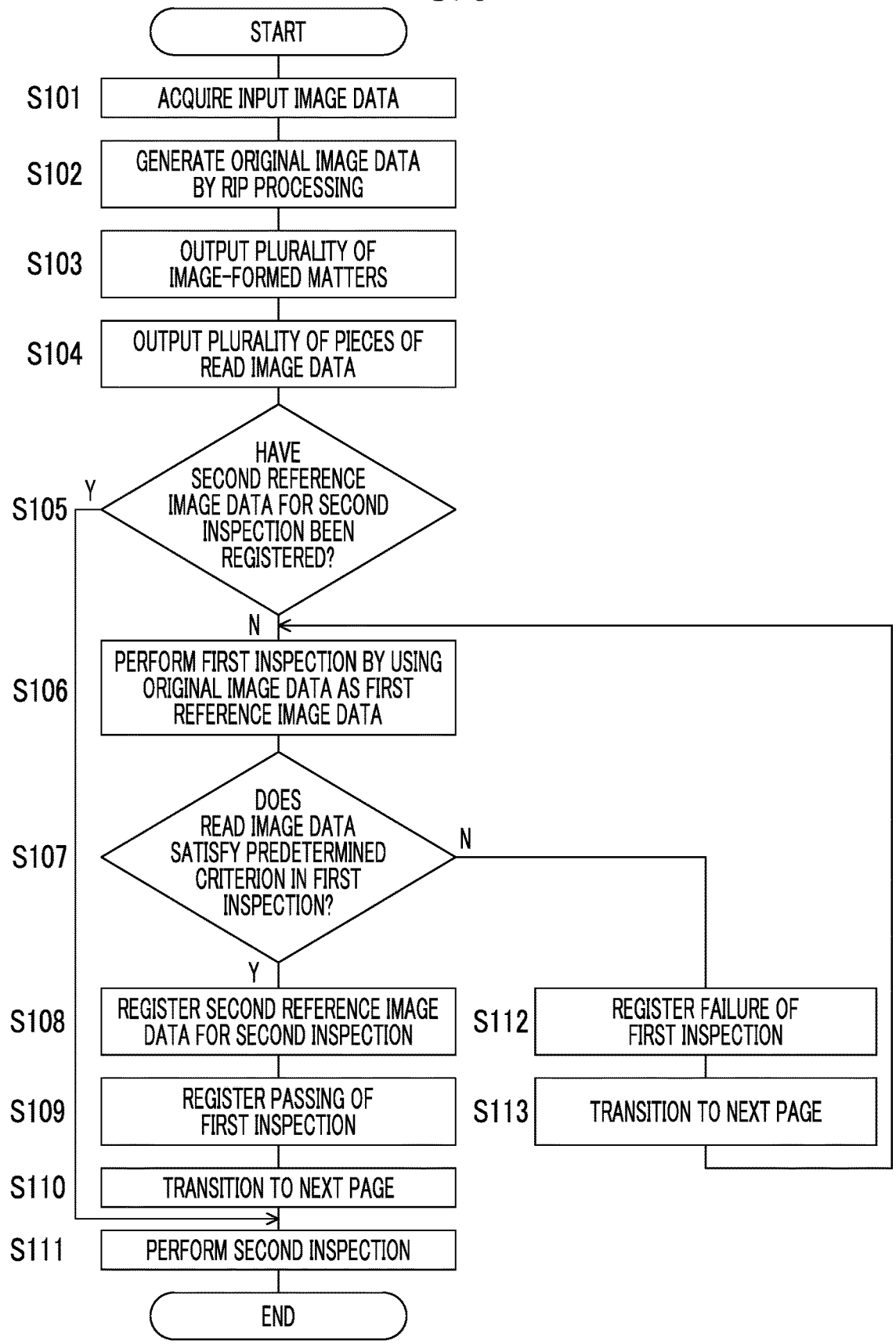

INSPECTION DEVICE FOR INSPECTING QUALITY OF PRINTED IMAGES

CROSS-REFERENCE TO RELATED APPLICATIONS

This application is based on and claims priority under 35 USC 119 from Japanese Patent Application No. 2020-157922 filed Sep. 18, 2020.

BACKGROUND

(i) Technical Field

The present invention relates to an inspection device, an image forming apparatus, and a non-transitory computer readable medium storing an inspection program.

(ii) Related Art

For example, JP6323190B discloses an image forming apparatus having a function of inspecting an image. The image forming apparatus includes an image reading unit and a feature amount calculation unit. The image reading unit reads each of images formed on a plurality of pieces of paper. The feature amount calculation unit sets any of a plurality of images read by the image reading unit, as a reference image, and sets the others as inspection target images. The feature amount calculation unit detects one or each of a plurality of feature points in the reference image and the inspection target images and calculates the feature amount of each feature point. The image forming apparatus further includes a determination unit that determines the quality of the inspection target image by collating the feature amount of each feature point in the reference image, which are detected by the feature amount calculation unit, with the feature amount of each feature point in the inspection target image, which are detected by the feature amount calculation unit. The determination unit searches each feature point in the reference image and the inspection target image, which is used for collating the feature amount, for each search area centered on each pixel of the inspection target image. Then, the determination unit determines the size of the search area in accordance with the size of one object or a plurality of objects in the reference image.

Patent Document 1: Japanese Patent No. 6323190.

SUMMARY

In a case where an inspection is performed by using, as reference image data, any of a plurality of pieces of read image data obtained by reading a plurality of image-formed matters, it is required that the plurality of pieces of read image data (or plurality of image-formed matters) are visually checked in selecting the reference image data.

At this time, in a case where the read image data having dirt or the like is selected as the reference image data, the read image data without dirt or the like may be determined as failure in the subsequent inspection.

Therefore, it is required to carefully visually check the pieces of image data in order to select appropriate reference image data, and this is troublesome. That is, with such a visual check, it is difficult to efficiently select the appropriate reference image data.

Aspects of non-limiting embodiments of the present disclosure relate to an inspection device, an image forming apparatus, and a non-transitory computer readable medium storing an inspection program capable of efficiently selecting reference image data in comparison to a case where any of a plurality of pieces of read image data obtained by reading a plurality of image-formed matters is visually selected as the reference image data.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an inspection device including a processor configured to perform a first inspection of using original image data as first reference image data and collating the first reference image data with at least one of a plurality of pieces of read image data obtained by reading image-formed matters obtained by forming the first reference image data on a plurality of recording media, and register read image data satisfying a predetermined criterion among the plurality of pieces of read image data as a result of the first inspection, as second reference image data for a second inspection different from the first inspection.

BRIEF DESCRIPTION OF THE DRAWINGS

Exemplary embodiment(s) of the present invention will be described in detail based on the following figures, wherein:

FIG. 5 is a flowchart illustrating an example of a processing flow by an inspection program according to the exemplary embodiment.

DETAILED DESCRIPTION

Hereinafter, exemplary embodiments for carrying out the technique of the present disclosure will be described in detail with reference to the drawings.

Figure 1:
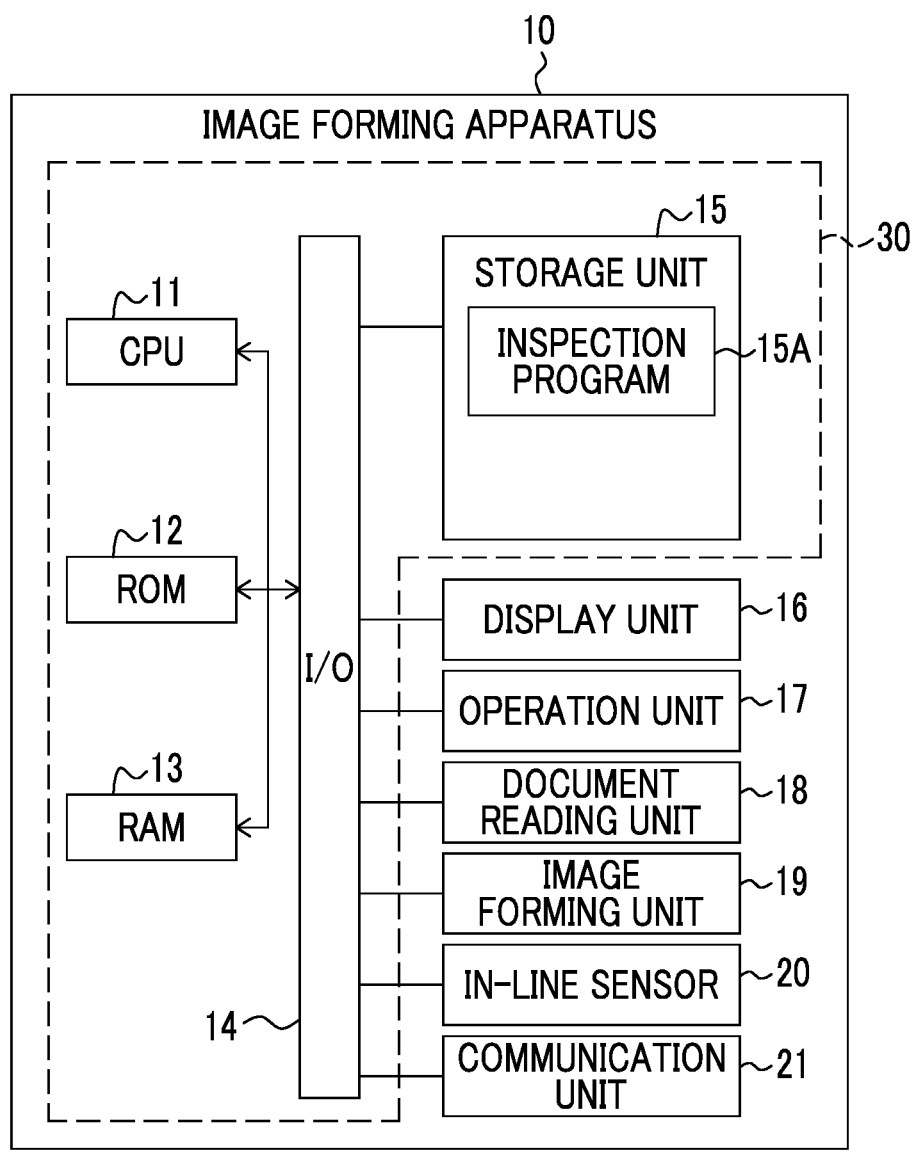
FIG. 1 is a block diagram illustrating an example of an electrical configuration of an image forming apparatus according to an exemplary embodiment.

FIG. 1 is a block diagram illustrating an example of an electrical configuration of an image forming apparatus 10 according to an exemplary embodiment.

As illustrated in FIG. 1, according to the exemplary embodiment, the image forming apparatus 10 includes an inspection device 30, a display unit 16, an operation unit 17, a document reading unit 18, an image forming unit 19, an in-line sensor 20, and a communication unit 21. The image forming unit 19 is an example of a forming unit. The in-line sensor 20 is an example of a reading unit.

The inspection device 30 includes a central processing unit (CPU) 11, a read only memory (ROM) 12, a random access memory (RAM) 13, an input/output interface (I/O) 14, and a storage unit 15. In the exemplary embodiment, the image forming apparatus 10 and the inspection device 30 are integrally provided, but the present disclosure is not limited to this. The image forming apparatus 10 and the inspection device 30 may be provided separately.

The units of the CPU 11, the ROM 12, the RAM 13, and the I/O 14 are connected to each other via a bus. Functional units including the storage unit 15, the display unit 16, the operation unit 17, the document reading unit 18, the image forming unit 19, the in-line sensor 20, and the communication unit 21 are connected to the I/O 14. Each of the functional units may communicate with the CPU 11 via the I/O 14.

A control unit is configured by the CPU 11, the ROM 12, the RAM 13, and the I/O 14. The control unit may be configured as a sub-control unit that controls an operation of a portion of the image forming apparatus 10, or may be configured as a portion of a main control unit that controls the entire operation of the image forming apparatus 10. For example, an integrated circuit such as a large scale integration (LSI) or an integrated circuit (IC) chipset is used for some or all of blocks of the control unit. An individual circuit may be used for each of the above blocks, or a circuit in which some or all of the blocks are integrated may be used. The above blocks may be provided integrally, or some blocks may be provided separately. A portion of each of the above blocks may be provided separately. The integration of the control unit is not limited to the LSI, and a dedicated circuit or a general-purpose processor may be used.

As the storage unit 15, for example, a hard disk drive (HDD), a solid state drive (SSD), or a flash memory is used. The storage unit 15 stores an inspection program 15A for executing inspection processing according to the exemplary embodiment. The inspection program 15A may be stored in the ROM 12.

The inspection program 15A may be installed in advance in the image forming apparatus 10, for example. The inspection program 15A may be realized in a manner that the inspection program is stored in a non-volatile storage medium or distributed via a network, and is appropriately installed in the image forming apparatus 10. Examples of the non-volatile storage medium include a compact disc read only memory (CD-ROM), a magneto-optical disk, an HDD, a digital versatile disc read only memory (DVD-ROM), a flash memory, and a memory card.

For example, a liquid crystal display (LCD) or an organic electro-luminescence (EL) display is used for the display unit 16. The display unit 16 may integrally include a touch panel. Various operation keys such as a numeric keypad and a start key are provided in the operation unit 17. The display unit 16 and the operation unit 17 receive various instructions from a user of the image forming apparatus 10. The various instructions include, for example, an instruction to start reading a document, and an instruction to start copying the document. The display unit 16 displays various types of information such as the result of processing executed in accordance with the instruction received from the user and the notification in response to the processing.

The document reading unit 18 takes documents placed on a paper feed tray of an automatic document feeder (not illustrated) provided on the upper portion of the image forming apparatus 10 one by one, and optically reads the taken document to obtain image information. Alternatively, the document reading unit 18 optically reads a document placed on a document stand such as platen glass to obtain image information.

The image forming unit 19 forms, on a recording medium such as paper, an image based on image information obtained by reading of the document reading unit 18 or image information obtained from an external personal computer (PC) connected via the network. In the exemplary embodiment, an electrophotographic method will be described as an example of a method of forming an image, but another method such as an inkjet method may be adopted.

In a case where the method of forming an image is an electrophotographic method, the image forming unit 19 includes a photoconductor drum, a charging unit, an exposing unit, a developing unit, a transfer unit, and a fixing unit. The charging unit applies a voltage to the photoconductor drum to charge the surface of the photoconductor drum. The exposing unit exposes the photoconductor drum charged by the charging unit with light corresponding to image information, so as to form an electrostatic latent image on the photoconductor drum. The developing unit develops the electrostatic latent image formed on the photoconductor drum with a toner to form a toner image on the photoconductor drum. The transfer unit transfers the toner image formed on the photoconductor drum to a recording medium. The fixing unit fixes the toner image transferred to the recording medium by heating and pressurizing.

The in-line sensor 20 reads an image formed on a recording medium by the image forming unit 19.

The communication unit 21 is connected to a network such as the Internet, a local area network (LAN), and a wide area network (WAN), and can communicate with an external PC or the like via the network.

Next, an image reading structure using the in-line sensor 20 will be described with reference to FIGS. 2A and 2B.

Figure 2A:
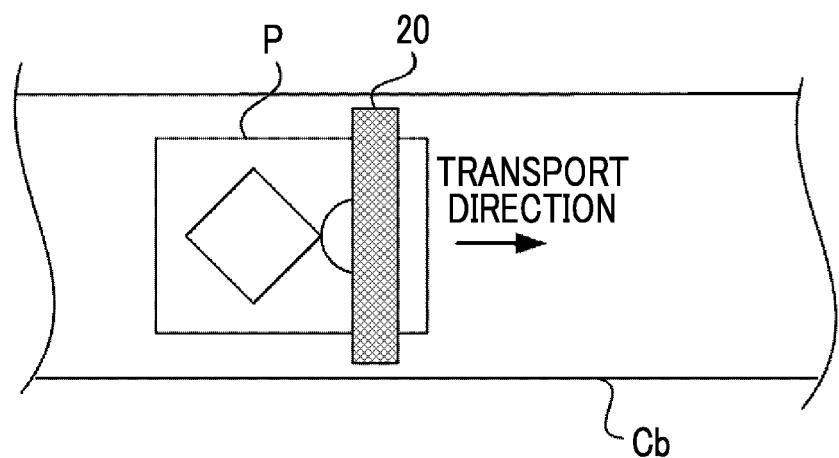
FIG. 2A is a top view illustrating an example of an image reading structure using an in-line sensor according to the exemplary embodiment.

FIG. 2A is a top view illustrating an example of the image reading structure using the in-line sensor 20 according to the exemplary embodiment. FIG. 2B is a side view illustrating the example of the image reading structure using the in-line sensor 20 according to the exemplary embodiment.

Figure 2B:
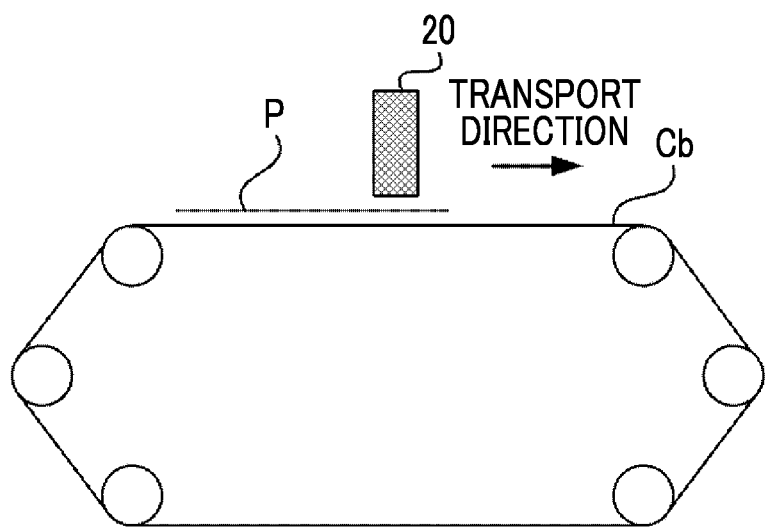
FIG. 2B is a side view illustrating the example of the image reading structure using the in-line sensor according to the exemplary embodiment.

As illustrated in FIGS. 2A and 2B, the in-line sensor 20 reads an image formed on a recording medium P such as paper. The in-line sensor is provided, for example, over a transport belt Cb for transporting the recording medium P between the above-described fixing unit and an exit tray (not illustrated). For example, sensors such as a charge coupled device (CCD) and a complementary metal oxide semiconductor (CMOS) are used for the in-line sensor 20. In the in-line sensor 20, in a case where light is emitted from a light source, reflected light from the recording medium P is imaged on a light receiving unit through a light receiving lens, and is converted into an electrical signal in accordance with the amount of the reflected light by the light receiving unit. Thus, measurement data is output. The in-line sensor 20 sequentially acquires the measurement data for each line of the recording medium P by moving the recording medium P in a transport direction. At a time point at which the entirety of the recording medium P passes, the in-line sensor 20 acquires read image data corresponding to one surface of the recording medium P. The acquired read image data is stored in the storage unit 15.

According to the exemplary embodiment, the image forming apparatus 10 has a function of performing a first inspection and a second inspection of inspecting an image-formed matter. Reference image data for the first inspection is an example of first reference image data. Reference image data for the second inspection is an example of second reference image data.

The first inspection is an inspection in which original image data is used as the first reference image data, and the read image data obtained by reading the image-formed matter obtained by forming the original image data on a recording medium is set as an inspection target. In the first inspection, the first reference image data being the original image data is collated with the read image data as the inspection target, and the quality of the read image data as the inspection target is determined. A plurality of pieces of read image data may be set as the inspection target. The original image data is image data that is the basis of an image to be image-formed (printed). For example, data (rasterized data) after raster image processor (RIP) processing, bitmap data, and graphics interchange format (GIF) data are applied.

In the second inspection, any of a plurality of pieces of read image data obtained by reading image-formed matters obtained by forming the original image data on a plurality of recording media is used as the second reference image data, and read image data obtained by reading a new image-formed matter is set as the inspection target. In the second inspection, the second reference image data being the read image data is collated with the read image data as the inspection target, and the quality of the read image data as the inspection target is determined. Similar to the first inspection, a plurality of pieces of read image data may be set as the inspection target.

In the second inspection, for example, pieces of read image data obtained by reading an image-formed matter obtained by forming original image data on some recording media are displayed as candidates for the second reference image data. The read image data selected from the pieces of read image data by the user is used as the second reference image data, and read image data of an image-formed matter newly obtained after that is set as the inspection target.

Next, the first inspection and the second inspection according to the exemplary embodiment will be specifically described with reference to FIG. 3.

Figure 3:
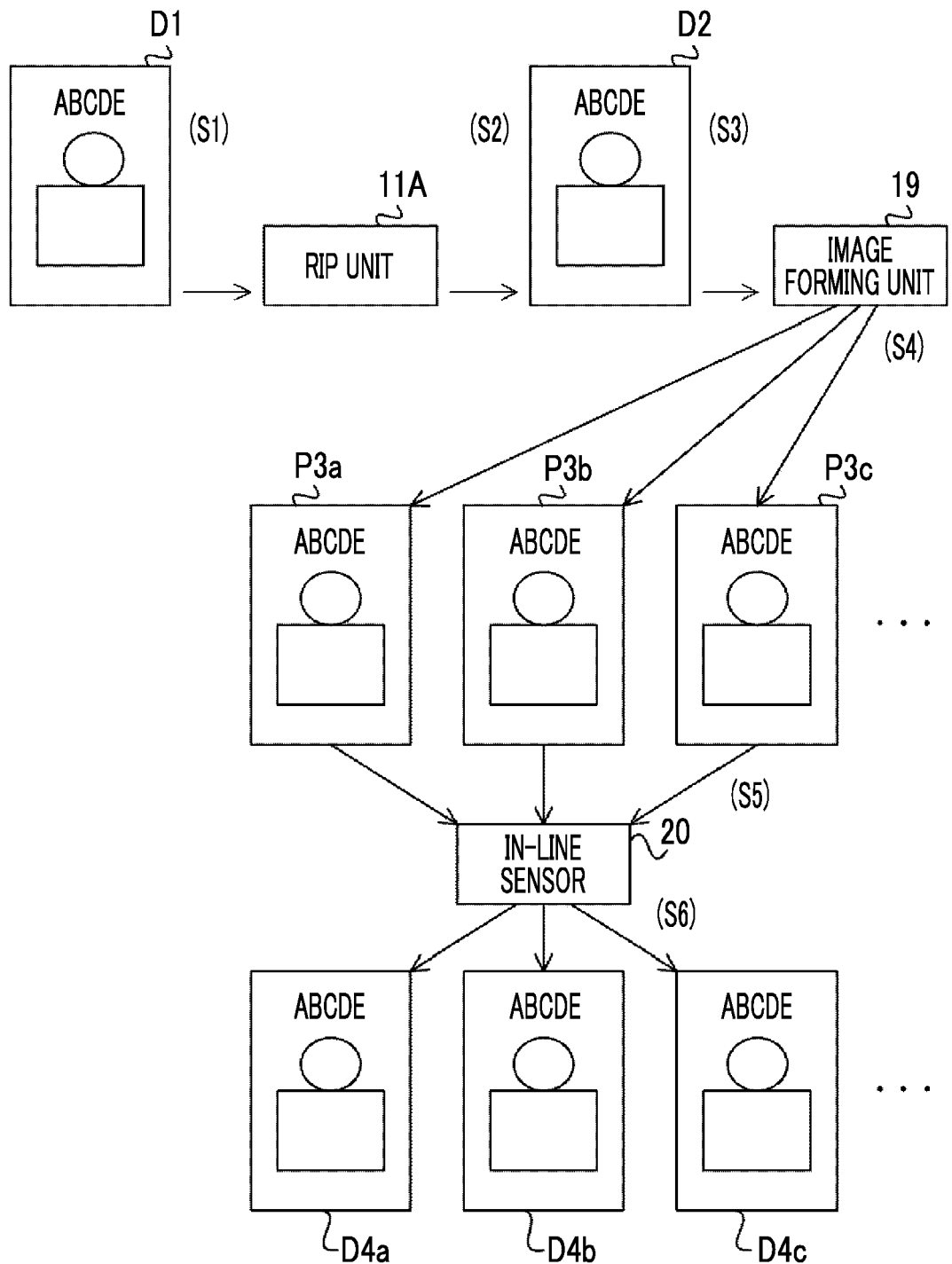
FIG. 3 is a diagram illustrating a first inspection and a second inspection according to the exemplary embodiment.

FIG. 3 is a diagram illustrating the first inspection and the second inspection according to the exemplary embodiment.

Firstly, the first inspection using original image data as the first reference image data will be described.

In (S1) of FIG. 3, a RIP unit 11A receives an input of image data D1 described in the page description language (PDL) as an example. Examples of the PDL include PRINTER CONTROL LANGUAGE (PCL, registered trademark) and POST SCRIPT (PS, registered trademark). The RIP unit 11A executes RIP processing, and a specific description will be made later.

In (S2), the RIP unit 11A executes the RIP processing on the image data D1 of which the input is received, and outputs original image data D2. In the first inspection, the original image data D2 is used as the first reference image data.

In (S3), the image forming unit 19 receives the input of the original image data D2.

In (S4), the image forming unit 19 forms the original image data D2 of which the input is received, for example, on a plurality of recording media, and outputs a plurality of image-formed matters P3a to P3c.

In (S5), as an example, as illustrated in FIGS. 2A and 2B described above, the in-line sensor 20 reads each of the plurality of image-formed matters P3a to P3c transported on the transport belt Cb.

In (S6), the in-line sensor 20 outputs a plurality of pieces of read image data D4a to D4c obtained by reading the plurality of image-formed matters P3a to P3c, respectively. In the first inspection, the plurality of pieces of read image data D4a to D4c are set as the inspection target.

In the first inspection, the first reference image data being the original image data D2 is collated with each of the plurality of pieces of read image data D4a to D4c as the inspection target, and the quality of each of the plurality of pieces of read image data D4a to D4c is determined.

Next, the second inspection using, as the second reference image data, any of a plurality of pieces of read image data obtained by reading a plurality of image-formed matters will be described.

In FIG. 3, the processes of (S1) to (S6) are similar. However, in the second inspection, any of a plurality of pieces of read image data D4a to D4c is used as the second reference image data, and new read image data output after the read image data D4c is set as the inspection target. In the second inspection, the second reference image data being any of the plurality of pieces of read image data D4a to D4c is collated with each of pieces of new read image data as the inspection target, and the quality of each of the pieces of new read image data is determined.

Here, in the second inspection, since the read image data is used as the reference image data, it is considered that the states (for example, size and line thickness) of the images to be collated are substantially identical to the states in the first inspection. Therefore, it is easier to perform the second inspection than to perform the first inspection. On the other hand, in the second inspection, as described above, it is required to visually check a plurality of pieces of read image data (or plurality of image-formed matters) in selecting the reference image data. With such visual check, it is difficult to efficiently select the appropriate reference image data.

Therefore, in the image forming apparatus 10 according to the exemplary embodiment, in a case where the second inspection is performed, the original image data is collated with at least one of the plurality of pieces of read image data, and the read image data satisfying a predetermined criterion is used as the reference image data for the second inspection. That is, the reference image data for the second inspection is automatically selected by the first inspection, and thus the reference image data is efficiently selected in comparison to a case where the reference image data is visually selected.

Figure 4:
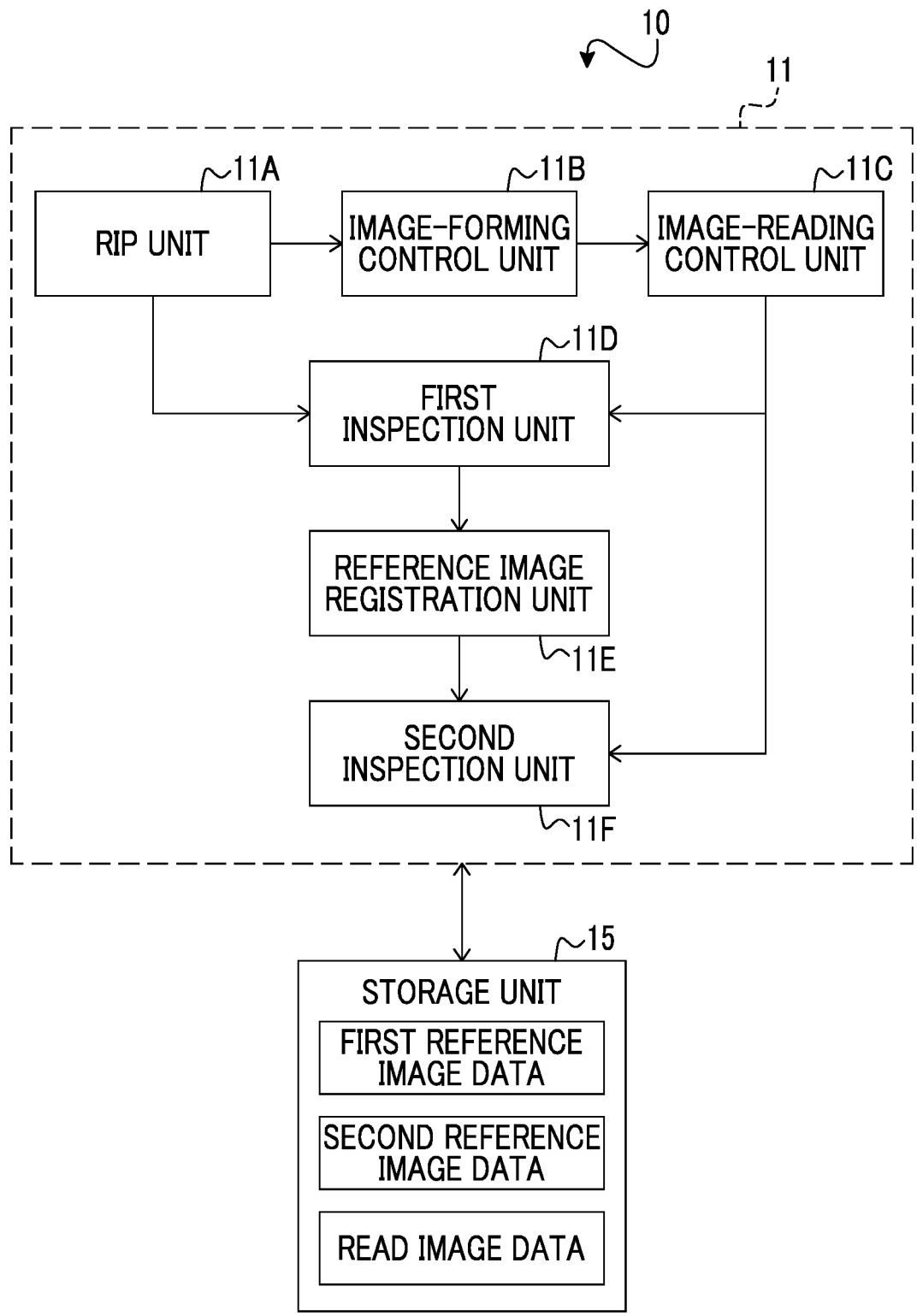
FIG. 4 is a block diagram illustrating an example of a functional configuration of an image forming apparatus according to the exemplary embodiment.

Specifically, the CPU 11 in the image forming apparatus 10 according to the exemplary embodiment writes the inspection program 15A stored in the storage unit 15 into the RAM 13, and executes the inspection program to function as the units illustrated in FIG. 4.

FIG. 4 is a block diagram illustrating an example of a functional configuration of the image forming apparatus 10 according to the exemplary embodiment.

As illustrated in FIG. 4, the CPU 11 in the image forming apparatus 10 according to the exemplary embodiment functions as the RIP unit 11A, an image-forming control unit 11B, an image-reading control unit 11C, a first inspection unit 11D, a reference image registration unit 11E, and a second inspection unit 11F.

As an example, the RIP unit 11A interprets the input image data described in the PDL to generate intermediate data, performs color conversion on the generated intermediate data, and performs rendering to generate original image data. As described above, the original image data may be, for example, rasterized data, bitmap data, or GIF data. The original image data generated by the RIP unit 11A is registered as the first reference image data in the storage unit 15. In the above-described example in FIG. 3, the first reference image data corresponds to the original image data D2.

The image-forming control unit 11B controls the operation of the image forming unit 19. The image forming unit 19 forms the first reference image data registered in the storage unit 15, on a plurality of recording media based on a control signal from the image-forming control unit 11B, and outputs a plurality of image-formed matters.

The image-reading control unit 11C controls the operation of the in-line sensor 20. The in-line sensor 20 reads each of the plurality of image-formed matters output from the image forming unit 19 based on a control signal from the image-reading control unit 11C, and outputs a plurality of pieces of read image data. The plurality of pieces of read image data output from the in-line sensor 20 are registered in the storage unit 15. In the above-described example in FIG. 3, the plurality of pieces of read image data correspond to the plurality of pieces of read image data D4a to D4c.

The first inspection unit 11D performs the first inspection of collating the first reference image data registered in the storage unit 15 with at least one of the plurality of pieces of read image data registered in the storage unit, and selects the read image data satisfying the predetermined criterion. Whether or not the read image data collated with the first reference image data satisfies the predetermined criterion can be determined by determination of a threshold value of each pixel. For example, in a case where the number of pixels in which a difference between pixel values of the corresponding pixels in the two pieces of data is equal to or more than a threshold value is less than a predetermined proportion, it is determined that the read image data satisfies the criterion. Here, the threshold value and the predetermined proportion are set as appropriate values by the user so as to satisfy a predetermined quality criterion.

The reference image registration unit 11E registers the read image data selected by the first inspection unit 11D in the storage unit 15 as the second reference image data of the second inspection.

In a case where the second inspection is performed, the second inspection unit 11F collates the second reference image data registered by the reference image registration unit 11E with the read image data of the image-formed matter set as the inspection target in the second inspection. Then, the second inspection unit determines the quality of the collated read image data. In the second inspection, for example, new read image data output after the plurality of pieces of read image data output in the first inspection is set as the inspection target. In the above-described example of FIG. 3, the new read image data output after the read image data D4c is set as the inspection target. The read image data on which the first inspection has been performed among the plurality of pieces of read image data output in the first inspection may be excluded from the inspection target, and the remaining read image data may be set as the inspection target. All of the plurality of pieces of read image data output in the first inspection may be set as the inspection target. That is, the first inspection and the second inspection may be performed together on at least some of the plurality of pieces of read image data output in the first inspection. Alternatively, the second inspection may not be performed on some of the plurality of pieces of read image data, on which the first inspection has been performed.

In the first inspection, the plurality of pieces of read image data are collated with the first reference image data in order from the leading read image data. The first inspection is repeated until the read image data satisfying the predetermined criterion is detected. At this time, in a case where the number of repetitions of the first inspection is equal to or more than a predetermined value, the first inspection unit 11D may issue a warning because there is a possibility that a problem or the like has occurred in the image forming unit 19. As the warning, for example, a warning message may be displayed as a text string, a warning message may be output by voice, or a warning sound such as a beep sound may be output.

In a case where a predetermined condition is detected during the second inspection, the second inspection unit 11F may perform the first inspection on at least one piece of read image data on which the second inspection has not been performed. Then, the second inspection unit may update the second reference image data. The predetermined condition is any of a condition in which the number of times of performing the second inspection is equal to or more than a predetermined value, a condition in which a toner cartridge is replaced, a condition in which a recording medium is clogged, and a condition in which a recording medium is replaced or added.

For example, in a case where a large amount of image-formed matters are output, the density in the image forming unit 19 may fluctuate, or the position of a recording medium may fluctuate. Therefore, the printing quality differs between the first page and the final page, and the inspection accuracy varies. Thus, in a case where the second inspection is performed a predetermined number of times or more, that is, in a case where a predetermined number or more of image-formed matters set as the inspection target for the second inspection are output, for example, it is required to perform the first inspection and update the second reference image data. Similarly, a case where a toner cartridge is replaced, a case where a recording medium is clogged, and a case where a recording medium is replaced or added also have an influence on the inspection accuracy. Therefore, for example, it is required to perform the first inspection and update the second reference image data.

Next, the action of the image forming apparatus 10 according to the exemplary embodiment will be described with reference to FIG. 5.

FIG. 5 is a flowchart illustrating an example of a processing flow by an inspection program 15A according to the exemplary embodiment.

Firstly, in a case where the image forming apparatus 10 is instructed to perform the inspection, the inspection program 15A is started to perform each of the following steps.

In Step S101 in FIG. 5, the CPU 11 acquires input image data from a document reading unit 18 or an external PC.

In Step S102, the CPU 11 performs RIP processing on the input image data acquired in Step S101 to generate original image data. The generated original image data is registered in the storage unit 15. As described above, for example, data (rasterized data) after the RIP processing, bitmap data, and GIF data are applied as the original image data.

In Step S103, the CPU 11 transmits a control signal to the image forming unit 19, and controls the operation of the image forming unit 19 to form the original image data registered in Step S102 on a plurality of recording media and output a plurality of image-formed matters.

In Step S104, the CPU 11 transmits a control signal to the in-line sensor 20, and controls the operation of the in-line sensor 20 to read the plurality of image-formed matters output in Step S103, and output a plurality of pieces of read image data.

In Step S105, the CPU 11 determines whether or not the second reference image data for the second inspection has been registered in the storage unit 15. In a case where it is determined that the second reference image data for the second inspection has been registered (in the case of affirmative determination), the process proceeds to Step S111. In a case where it is determined that the second reference image data for the second inspection has not been registered, that is, the second reference image data is in a not-registered state (in the case of negative determination), the process proceeds to Step S106.

In Step S106, the CPU 11 performs the first inspection using the original image data registered in Step S102 as the first reference image data. In the first inspection, as described above, as an example, the plurality of pieces of read image data are collated with the first reference image data in order from the leading read image data.

In Step S107, as a first inspection, the CPU 11 determines whether or not the leading page of the plurality of pieces of read image data satisfies a predetermined criterion. In a case where it is determined that the leading page satisfies the predetermined criterion (in the case of affirmative determination), the process proceeds to Step S108. In a case where it is determined that the first page does not satisfy the predetermined criterion (in the case of negative determination), the process proceeds to Step S112.

In Step S108, the CPU 11 registers the leading page satisfying the predetermined criterion in the storage unit 15 as the second reference image data for the second inspection.

In Step S109, the CPU 11 registers the passing of the first inspection in association with the leading page satisfying the predetermined criterion.

In Step S110, the CPU 11 transitions to the next page of the plurality of pieces of read image data, and designates the next page as the inspection target of the second inspection.

In Step S111, the CPU 11 performs the second inspection on the next page designated as the inspection target of the second inspection in Step S110 by using the leading page as the second reference image data. Then, the CPU displays an inspection result and ends a series of processes by the inspection program 15A.

In Step S112, the CPU 11 registers the failure of the first inspection in association with the leading page that does not satisfy the predetermined criterion.

In Step S113, the CPU 11 transitions to the next page of the plurality of pieces of read image data, and designates the next page as the inspection target of the first inspection. The CPU causes the process to return to Step S106, and then repeats the processes.

As described above, according to the exemplary embodiment, in a case where the second inspection is performed, the original image data is collated with at least one of the plurality of pieces of read image data, and the read image data satisfying the predetermined criterion is registered as the reference image data of the second inspection. That is, the reference image data of the second inspection is automatically selected by the first inspection. Therefore, the reference image data is efficiently selected in comparison to a case where the reference image data is visually selected.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Hitherto, the examples of the inspection device and the image forming apparatus according to the exemplary embodiment are described above. The exemplary embodiment may have a form of a program for causing a computer to perform the functions of the units in the inspection device. The exemplary embodiment may have a form of a non-transitory computer readable storing medium that stores the programs.

In addition, the configuration of the inspection device described in the above exemplary embodiment is just an example, and may be changed depending on the situation in a range without departing from the gist.

The processing flow of the program described in the above exemplary embodiment is also just an example. In a range without departing from the gist, unnecessary steps may be deleted, a new step may be added, or the processing order may be changed.

In the above exemplary embodiment, the case where the program is executed, and thereby the processing according to the exemplary embodiments is realized by the software configuration using the computer is described, but the present disclosure is not limited to this. The exemplary embodiment may be realized, for example, by a hardware configuration or a combination of a hardware configuration and a software configuration.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An inspection device comprising:
a processor configured to:
perform a first inspection of using original image data as first reference image data and collating the first reference image data with at least one of a plurality of pieces of read image data obtained by reading image-formed matters, wherein the image-formed matters are obtained by forming the first reference image data on a plurality of recording media; and
automatically register read image data satisfying a predetermined criterion among the plurality of pieces of read image data as a result of the first inspection, as second reference image data for a second inspection different from the first inspection;
in a case where the second inspection is performed, collate the read image data of the image-formed matter set as an inspection target of the second inspection with the registered second reference image data; and
determine quality of the collated read image data.

2. The inspection device according to claim 1, wherein the processor is configured to:
in a case where the second inspection is performed, exclude the read image data subjected to the first inspection among the plurality of pieces of read image data, from inspection targets.

3. The inspection device according to claim 2,
wherein, in the first inspection, the plurality of pieces of read image data are collated with the first reference image data in order from leading read image data, and the first inspection is repeated until the read image data satisfying the predetermined criterion is detected.

4. The inspection device according to claim 3, wherein the processor is configured to:
issue a warning in a case where the number of repetitions of the first inspection is equal to or more than a predetermined value.

5. The inspection device according to claim 3, wherein the processor is configured to:
in a case where a predetermined condition is detected during the second inspection, perform the first inspection on at least one piece of the read image data on which the second inspection has not been performed; and
update the second reference image data.

6. The inspection device according to claim 2, wherein the processor is configured to:
in a case where a predetermined condition is detected during the second inspection, perform the first inspection on at least one piece of the read image data on which the second inspection has not been performed; and
update the second reference image data.

7. The inspection device according to claim 1,
wherein, in the first inspection, the plurality of pieces of read image data are collated with the first reference image data in order from leading read image data, and
the first inspection is repeated until the read image data satisfying the predetermined criterion is detected.

8. The inspection device according to claim 7, wherein the processor is configured to:
issue a warning in a case where the number of repetitions of the first inspection is equal to or more than a predetermined value.

9. The inspection device according to claim 8, wherein the processor is configured to:
in a case where a predetermined condition is detected during the second inspection, perform the first inspection on at least one piece of the read image data on which the second inspection has not been performed; and
update the second reference image data.

10. The inspection device according to claim 7, wherein the processor is configured to:
in a case where a predetermined condition is detected during the second inspection, perform the first inspection on at least one piece of the read image data on which the second inspection has not been performed; and
update the second reference image data.

11. The inspection device according to claim 1, wherein the processor is configured to:
in a case where a predetermined condition is detected during the second inspection, perform the first inspection on at least one piece of the read image data on which the second inspection has not been performed; and
update the second reference image data.

12. The inspection device according to claim 11,
wherein the predetermined condition is any of a condition in which the number of times of performing the second inspection is equal to or more than a predetermined value, a condition in which a toner cartridge is replaced, a condition in which a recording medium is clogged, and a condition in which a recording medium is replaced or added.

13. An image forming apparatus comprising:
a forming unit that forms original image data on a plurality of recording media;
a reading unit that reads a plurality of image-formed matters, wherein the image-formed matters are obtained by formation of the forming unit; and
an inspection device including a processor configured to:
perform a first inspection of using the original image data as first reference image data and collating the first reference image data with at least one of a plurality of pieces of read image data obtained by reading of the reading unit; and
automatically register read image data satisfying a predetermined criterion among the plurality of pieces of read image data as a result of the first inspection, as second reference image data for a second inspection different from the first inspection;
in a case where the second inspection is performed, collate the read image data of the image-formed matter set as an inspection target of the second inspection with the registered second reference image data; and
determine quality of the collated read image data.

14. A non-transitory computer readable medium storing an inspection program causing a computer to execute:
performing a first inspection of using original image data as first reference image data and collating the first reference image data with at least one of a plurality of pieces of read image data obtained by reading image-formed matters, wherein the image-formed matters are obtained by forming the first reference image data on a plurality of recording media; and
automatically registering read image data satisfying a predetermined criterion among the plurality of pieces of read image data as a result of the first inspection, as second reference image data for a second inspection different from the first inspection;
in a case where the second inspection is performed, collate the read image data of the image-formed matter set as an inspection target of the second inspection with the registered second reference image data; and
determine quality of the collated read image data.

* * * * *